April 18, 1961 W. N. WITMOR 2,980,401
CABLE BLOCK
Filed Sept. 22, 1959 2 Sheets-Sheet 1

April 18, 1961   W. N. WITMOR   2,980,401
CABLE BLOCK
Filed Sept. 22, 1959   2 Sheets-Sheet 2
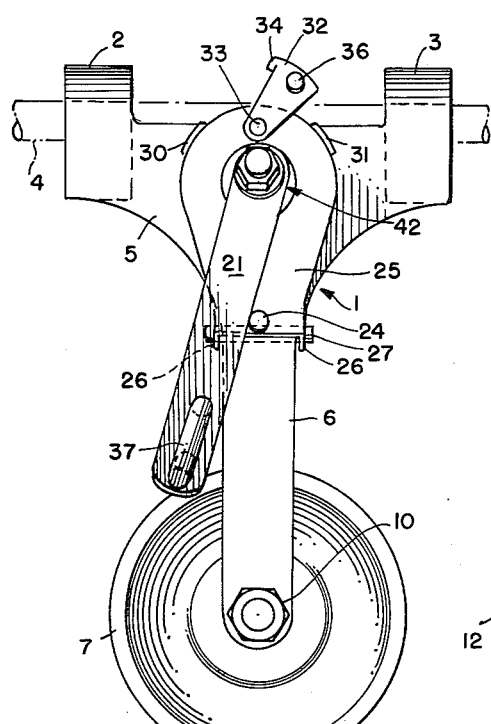
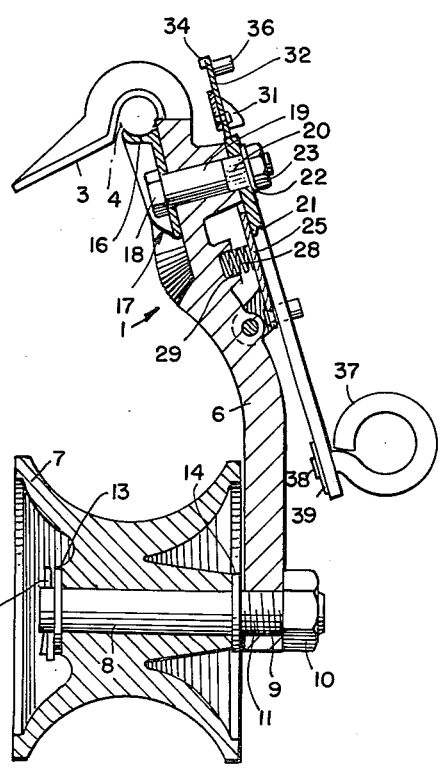
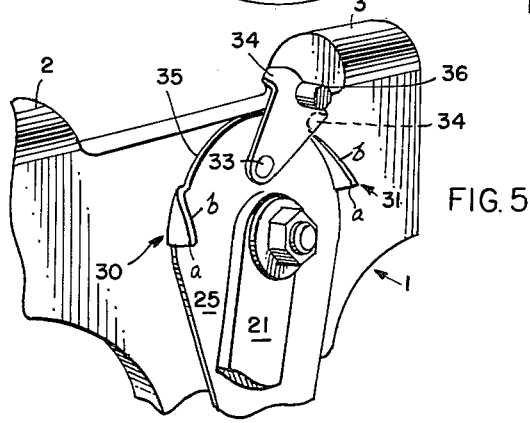

United States Patent Office 2,980,401
Patented Apr. 18, 1961

2,980,401

CABLE BLOCK

William N. Witmor, deceased, late of 2364 Canby St., Penbrook, Pa., by Citizens Trust Co. of Harrisburg, executor, Harrisburg, Pa., assignor to Beatrice L. Witmor, now by change of name Beatrice L. McCormick Filed Sept. 22, 1959, Ser. No. 841,651

1 Claim. (Cl. 254—196)

This invention relates to a cable block or pulley block, sometimes called a cable roller, for stringing aerial cables across country, such as are used, for example, for telephone lines.

It is customary to first string a strong steel wire, sometimes referred to as a messenger wire, between the poles or towers to serve as a support. The heavy telephone cable is then clamped to this messenger wire which supports it permanently. The usual method for doing this is to attach cable blocks at intervals on the messenger wire, then string a rope through the blocks and use it to pull the heavy cable through a series of blocks so that the cable is supported in a suitable position adjacent to the messenger wire. Clamps are then applied to permanently hold the cable in place on the wire and the cable blocks are removed. In this way, cables are strung from pole to pole with a minimum amount of climbing by the persons doing the stringing.

The cables containing the wires are usually coated with lead and are quite heavy. It is highly important, therefore, that the cable blocks remain in position on the messenger wire during the stringing operation. For this purpose, clamping means are usually provided. It is also highly desirable that the clamping means be capable of being operated from the ground by a pike or long pole. It is also desirable that the cable block be clamped to the messenger wire in such a way that it cannot be accidentally displaced from the messenger wire.

One of the objects of the present invention is to provide a new and improved cable block characterized by the fact that it is easily and simply applied and clamped in place on a messenger wire.

Another object is to provide a new and improved cable block in which the clamping means are such that accidental displacement cannot readily occur.

Still a further object of the invention is to provide a new and improved cable block which can be hung over a messenger wire from a pike having a hook on the end thereof and then clamped into place merely by pulling downwardly on the pike until the desired clamping effect has been obtained.

A still further object is to provide a cable block having clamping means of the type described wherein the clamp can be partially released in order to permit the cable block to slide along the messenger wire to a predetermined position before it is clamped in the desired position.

Another object of the invention is to provide a cable block having clamping means which operates by a rotary movement and can be clamped by operation either in a clockwise or counterclockwise direction.

Other objects and advantages of the invention will appear from the following description in conjunction with the accompanying drawings in which:

Fig. 3 is a rear elevational view of the cable block shown in Fig. 1;

Figure 1:
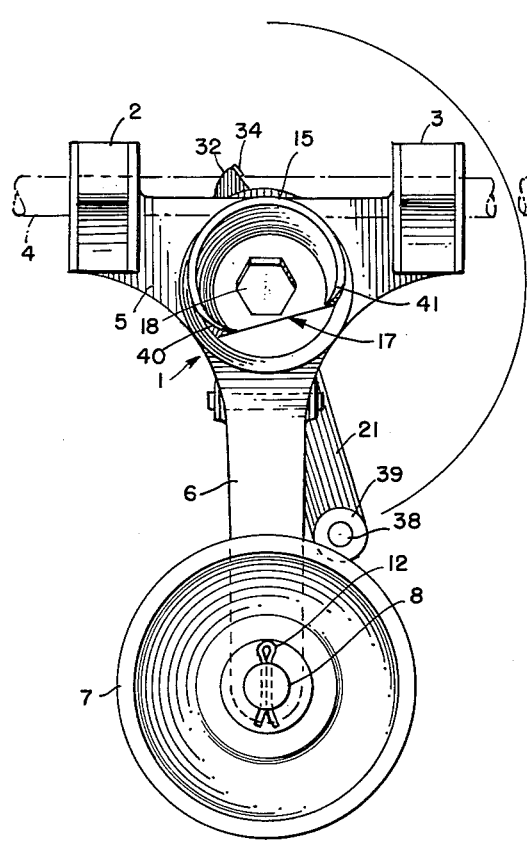
Fig. 1 is a front elevational view of a cable block constructed in accordance with the invention showing the block clamped or locked on a messenger wire.

Fig. 4 as a sectional view taken centrally through the cable block shown in Fig. 1; and Fig. 5 is a perspective view with parts broken away of a portion of the clamping mechanism of the cable block shown in Figs. 1 to 4.

In general, the cable block of the present invention comprises hanger means adapted to hang the cable block over a messenger wire, a frame having a downward extension from said hanger means with a grooved pulley mounted on the lower part thereof and adapted to rotate on an axis of rotation extending transversely from said downward extension, clamping means comprising a cam element adapted to clamp said cable block to said messenger wire when said cam element is moved to a predetermined position and to release said cable block from its clamped association with the messenger wire when said cam element is moved to another predetermined position so that the cable block can be removed from the messenger wire after the clamping action has been released, and means to operate said clamping means.

A further feature of the invention is the provision of means associated with said clamping means whereby said cam element can be partially released from its clamping position and still hold the cable block on the messenger wire so that it can slide along said wire but cannot be accidentally displaced therefrom.

An additional feature of the invention is the provision of positive means for holding the cable block in association with the messenger wire so that it cannot be displaced therefrom except by positive and intentional movement of the operator.

Another feature of the invention is the provision of a cable block of the type described fitted with a ring or other suitable means attached to the operating lever for the clamping cam whereby the cable block can be held on the end of a pike or pole containing a hook or other suitable element on one end and suspended in position from the ground, then locked into position by a downward pull of the pike or alternatively locked in position by the downward pull of a rope attached to the operating lever of the clamping cam.

Another feature of the invention is the provision of means for operating the clamping cam from either the left hand side or the right hand side where close quarters do not permit the operation from either one side or the other.

Referring to the drawings, wherein like numerals designate like parts, the cable block illustrated which represents the best mode contemplated for the practice of the invention, consists of a frame generally indicated at 1 provided with a pair of hanging members 2 and 3 which are adapted to fit over a messenger wire shown in dotted lines at 4.

The hanging members 2 and 3 are preferably cast or formed as a part of the upper portion 5 of the frame 1. The frame as a whole is generally T-shaped with the hanging members 2 and 3 being formed at opposite sides of the upper part of the T. The lower part of the T constitutes a downward extension 6 which is also preferably integrally formed with the remainder of the frame either by casting or machining.

A cable supporting pulley 7 is mounted on the downward extension 6 to rotate freely on a shaft 8. The lower part of the extension 6 is provided with a hole or opening 9 (see Fig. 4) through which shaft 8 passes and is held in place at one end by means of a nut 10 engaging the threaded portion 11 of the shaft 8 and at the other end by a cotter pin 12 which passes through a suitable opening in the end of the shaft 8 in a conventional manner. Metal washers 13 and 14 are also provided to permit smooth rotation of the pulley.

The clamping means comprises a generally circular cam element 15 having a grooved surface 16 adapted to engage the outer surface of the messenger wire 4 as can best be seen in Fig. 4. One side of the cam element 15 is foreshortened as shown at 17. The cam element 15 is fixed to the head 18 of shaft 19 (see Fig. 4) or to the shaft itself, either by being welded thereto or by being fastened in some other suitable manner so that as the shaft 19 rotates, the cam element 15 will also rotate. The shaft 19 has a flattened portion 20 which is adapted to engage the sides of a rectangular hole in one end of the lever 21 so that the shaft 19 will move in response to the movement of lever 21. The cam assembly and lever 21 are held in place by metal washer 22 and nut 23 mounted on a threaded end of the shaft 19. Thus, the lever 21 pivots or rotates the shaft 19 and the cam element 15 moves in response to this rotation.

The movement of the lever 21 is limited in a downward direction by a stop 24 which is preferably a metal stud which is affixed to and extends downwardly from a spring pressed plate member 25. The plate member 25 is provided with ears 26, 26 which extend inwardly toward the frame 1 and are provided with holes that engage a pin or shaft 27, the latter being press-fitted or otherwise formed on the frame 1. The member 25 is mounted on the shaft 27 in such a way that it can pivot toward and away from the upper portion of the frame under the influence of a spring 28. The spring 28 is mounted in a hole or well 29 formed in the frame 1 as shown in Fig. 4.

The member 25 which is formed of sheet metal or other suitable similar material is also provided with a pair of outwardly extending ears 30 and 31 each of which has a substantially horizontal portion $a$ extending substantially at right angles to the outer surface of member 25 and a sloping or slanted portion $b$.

Figure 2:
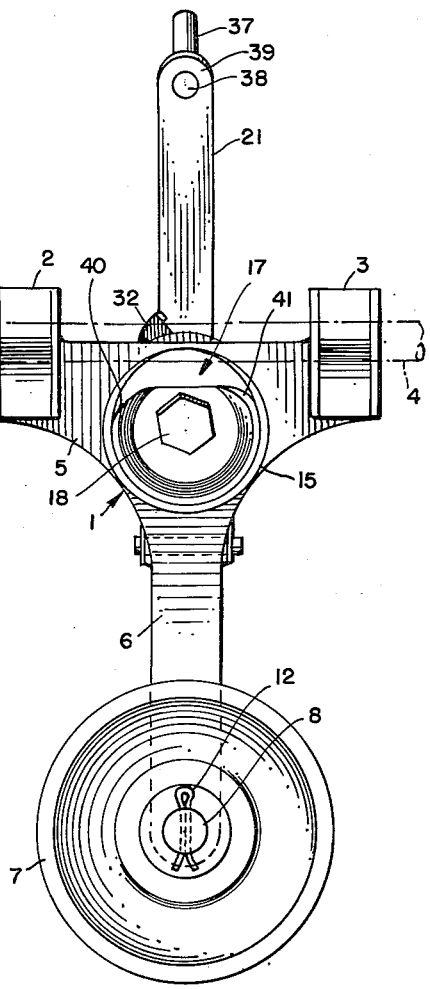
Fig. 2 is a front elevational view of the cable block of Fig. 1 shown in position on a messenger wire before being clamped or locked thereon.

The upper limit of movement of the lever 21 is controlled by the pivotally mounted element 32 which is pivoted for movement on a stub shaft 33 mounted on the spring pressed member 25. The pivotal movement of the element 32 from one side to the other is limited by a pair of ears 34, 34 which extend inwardly in the direction of the frame 1 and engage the upper curved surface 35 substantially at the juncture of said surface with the ends of the sloping portions $b$ of elements 30 and 31. Thus, the element 32 is limited in its movement on both sides. An outwardly extending stub shaft 36 serves to limit the movement of lever 21 when the latter is in its up position as shown in Fig. 2. The lever 21 therefore can be rotated to its up position by depressing the member 25 so that the lever 21 will pass over the elements 30 and 31. Element 25 can also be depressed far enough so that the lever 21 will pass over the top of the stop member 36 and therefore the lever 21 can be moved either to the right side or to the left side of the cable block and will operate from either position.

The outer end of the lever 21 is provided with a ring member 37 having a stub shaft which passes through the lever 21 and is flattened on the end at 38. A washer 39 is inserted before the end 38 is flattened. The ring member 37 fits loosely in the hole provided in lever 21 and is capable of rotating. It has an opening large enough to receive the end of a pike or pole or a hook fastened to a pike or pole. If desired, a rope may also be attached to the ring member 37.

It will be observed that the frame 1 is formed or bent in such a way as shown in Fig. 4 that the hanger means 2 and 3 are directly above the pulley 7 and the portions of the hanger means 2 and 3 which fit over the messenger wire are substantially in the same vertical plane as the center of the pulley 7 so that the conduit which is supported by the pulley 7 will be directly below the messenger wire.

The operation of the device is as follows. A lineman on the ground adjusts the cable block so that the lever 21 is in the up-position shown in Fig. 2. In Fig. 2 this adjustment is shown with the stop member 32 on the left hand side so that the lever 21 is in a substantially vertical position and can only rotate clockwise. If there is an obstruction on the right hand side, such as a pole, so that it is desirable to rotate the lever 21 counterclockwise, the spring pressed plate 25 is depressed again the pressure of the spring 28 sufficiently so that the lever 21 will pass over the outer end of the stop 36 on stop member 32. When the plate 25 is released, the stop 36 is then on the right hand side of the lever 21 or in other words, the stop member 32 is on the opposite side to that shown in Fig. 2. In this position the lever 21 is in a substantially vertical position but can only rotate counterclockwise.

In any suitable manner, for example, by inserting a pole or pike containing a hook at one end into the opening in the ring member 37, the entire cable block is lifted into the air and placed over the messenger wire 4 so that the hanging members 2 and 3 engage the messenger wire 4. The lever 21 is then pulled downwardly either by means of a hook in the pike used to hoist it initially or by means of a rope attached to the ring member 37. As it is pulled downwardly it approaches the position shown in Fig. 1. In this position the cam member 15 has been rotated so that it is in tightly clamping association with the messenger wire 4. The cable block is then so clamped to the messenger wire 4 that it cannot move. If it is desired to loosen it slightly to permit it to slide along the messenger wire 4, this can be done by reversing the movement of the lever 21. As this movement is reversed the cam member 15 rotates until the foreshortened or flat edge 17 is approximately vertical. The cam member 15 is so constructed that the portions 40 and 41 thereof taper inwardly and this produces what might be described as an eccentric cam or an eccentrically mounted cam. When the flat or foreshortened edge 17 is substantially vertical the inwardly tapered portions 40 or 41, as the case may be, are close enough to the messenger wire to prevent the cable block from slipping off of the wire but do not clamp it tightly enough to keep it from moving or sliding along the wire. The lever 21 in this position is in contact with the straight sides $a$, $a$, as the case may be, of the ears 30 and 31, and therefore cannot move upwardly anymore unless the spring pressed plate member 25 is depressed against the pressure of the spring 28. This makes it practially impossible for the cable block to be dislodged from the messenger wire even though it is still capable of sliding along the wire. When it is desired to clamp the block in position again after sliding it along the wire, all that is necessary is to pull the lever 21 to the lowermost position shown in Fig. 1. A suitable number of cable blocks are placed in the desired position in a given span between two poles or towers and the cable is strung therethough by pulling a rope over the pulleys 7 of the cable blocks and holding the cable in place until tie clamps have been applied at intervals to connect the cable to the messenger wire. The cable blocks are then removed by pressing on the spring plate member 25 of each block and rotating the lever 21 over the juncture between the elements $a$ and $b$ of the ears 30, 31 (see Fig. 5). This causes the flat edge 17 of the cam element 15 to rotate to a position substantially parallel with the messenger wire and in this position the cable block is no longer clamped to the messenger wire and can readily be removed therefrom merely by lifting it so that the hanging members 2 and 3 becomes disengaged. The operation of loosening the cable block will ordinarily be accomplished manually but once the cable block has been loosened it can be removed from the messenger wire by inserting a pike or pole equipped at one end with a hook or spike into the opening of the ring member 37. The loosening and removal of the cable block is preferably carried out by the lineman who applies the clips which hold the cable on the messenger wire.

The invention provides a new and improved cable block which can be applied and clamped in place on a messenger wire very simply and easily. It also provides a cable block which is so constructed and operated that accidental displacement cannot readily occur. Additionally, it provides a cable block that can be fastened in place on a messenger wire by an operator standing on the ground using either a rope or a long pole with a hook on the end for that purpose. Another advantage of the cable block of the present invention resides in the fact that the clamping lever can be so adjusted as to rotate in either a clockwise or a counterclockwise direction making it possible to apply the cable block in one direction if a tight situation exists in the other. Another advantage of the invention is that the frame, including the hanger means, can all be cast in one piece from light weight metals, such as aluminum or aluminum alloys. An additional advantage of the invention is that the construction of the clamping means permits a substantial amount of tolerance in the size of the messenger wire to which the cable block may be applied.

Another advantage of the invention is the relatively simple construction of the limiting means which makes it possible to move the actuating lever for the rotary cam through an arc of approximately 180° either clockwise or counterclockwise as desired. The pivotally mounted plate member 25 is provided with a hole or opening 42 which fits around the portion of the frame that holds the connecting bolt 19. The spring 28 normally holds the plate member 25 pressed against the lever 21 so that in the up-position of the lever 21 the stop member 36 limits the movement of lever 21 and in the down-position of lever 21 the stop members 30 or 31 and the stop member 24 limit the movement of lever 21. However, merely by pressing inwardly on the plate member 25 the stop members 30 or 31 can be rendered inoperative so that the lever 21 can be advanced from its down-position to its up-position. In the same manner, pressure on the plate 25 permits the lever 21 to be advanced from one side to the other over the stop member 36.

The invention is hereby claimed as follows:

A cable block comprising hanger means adapted to hang a cable block over a messenger wire, a frame having a downward extension from said hanger means, a grooved pulley mounted on the lower part of said frame and rotating on an axis of rotation extending transversely from said downward extension, clamping means comprising a rotary eccentric cam element adapted to clamp said cable block to said messenger wire when said cam element is moved to a predetermined position and to release said cable block from its clamped association with the messenger wire when said cam element is moved to another predetermined position so that the cable block can be removed from the messenger wire after the clamping means have been released, and means to control the movement of said cam element comprising a lever connected to said cam element and adapted to rotate it, a plate member pivotally mounted at one end from said frame, means between said frame and said plate member to hold the latter resiliently against said lever, means providing a hole in said plate member around the connection between said lever and said cam element permitting said plate member to be depressed away from said lever adjacent the end of said plate member opposite its pivoted end, and stop members on said plate member adapted to limit the movement of said lever in predetermined positions when said plate member is held against said lever and adapted to permit movement of said lever over said stop members when said plate member is depressed.

References Cited in the file of this patent

UNITED STATES PATENTS

| | | |
|---|---|---|
| 57,316 | Rogers et al. | Aug. 21, 1866 |
| 165,705 | Brown et al. | July 20, 1875 |
| 347,943 | Leonardson | Aug. 24, 1886 |
| 856,335 | Callahan | June 11, 1907 |
| 1,340,989 | Smith | May 25, 1920 |
| 2,566,233 | Makie | Aug. 28, 1951 |